United States Patent
Tian et al.

(10) Patent No.: US 9,619,477 B1
(45) Date of Patent: Apr. 11, 2017

(54) SYSTEMS AND METHODS FOR ACCELERATING BACKUP OPERATIONS

(71) Applicant: Symantec Corporation, Mountain View, CA (US)

(72) Inventors: Yong Tian, Beijing (CN); Yingsong Jia, Beijing (CN); Chao Lei, Beijing (CN); William Browning, Blaine, MN (US)

(73) Assignee: Veritas Technologies, Mountain View, CA (US)

( * ) Notice: Subject to any disclaimer, the term of this patent is extended or adjusted under 35 U.S.C. 154(b) by 233 days.

(21) Appl. No.: 13/835,035

(22) Filed: Mar. 15, 2013

(51) Int. Cl.
*G06F 17/30* (2006.01)

(52) U.S. Cl.
CPC .............................. *G06F 17/30129* (2013.01)

(58) Field of Classification Search
CPC .......................... G06F 11/1458; G06F 11/2082
USPC ........................................................ 707/655
See application file for complete search history.

(56) References Cited

U.S. PATENT DOCUMENTS

| | | | | |
|---|---|---|---|---|
| 8,600,941 B1 * | 12/2013 | Raj et al. | ....................... | 707/640 |
| 8,738,870 B1 * | 5/2014 | Balasubramanian et al. | ............................. | 711/161 |
| 9,008,080 B1 * | 4/2015 | Mehta | ..................... | H04L 49/60 370/327 |
| 2001/0055274 A1 * | 12/2001 | Hegge et al. | .................. | 370/229 |
| 2006/0274647 A1 * | 12/2006 | Wang | ...................... | H04L 45/00 370/216 |
| 2008/0016131 A1 * | 1/2008 | Sandorfi | ............. | G06F 11/1458 |
| 2011/0125720 A1 * | 5/2011 | Jayaraman | ........ | G06F 17/30156 707/692 |
| 2012/0017060 A1 * | 1/2012 | Kapanipathi | ......... | G06F 3/0608 711/162 |

* cited by examiner

*Primary Examiner* — Boris Gorney
*Assistant Examiner* — Allen Lin
(74) *Attorney, Agent, or Firm* — FisherBroyles LLP (57) ABSTRACT

A computer-implemented method for accelerating backup operations may include (1) identifying a volume of data that may be stored by a computing system attached to a network and that may be designated for a backup to a deduplicated data store, (2) monitoring traffic on the network for at least one data object destined for the volume of data, (3) copying the data object from the traffic on the network and (4) seeding the deduplicated data store with the data object before the backup to the deduplicated data store. Various other methods, systems, and computer-readable media are also disclosed.

20 Claims, 7 Drawing Sheets

SYSTEMS AND METHODS FOR ACCELERATING BACKUP OPERATIONS

BACKGROUND

In the digital age, organizations increasingly rely on digitally-stored data. To protect against data loss, an organization may use a backup system to back up important data. In order to reduce storage requirements for backups, an organization may use a deduplication storage system.

Deduplication storage systems are generally used to reduce the amount of storage space required to store files by identifying redundant data patterns within similar files. For example, a deduplication storage system may divide multiple files into file segments and then identify at least one file segment obtained from one file that is identical to at least one file segment obtained from another file. Rather than storing multiple instances of a particular file segment, the deduplication storage system may store a single instance of the file segment and allow multiple files to simply reference that instance of the file segment to reduce the amount of storage space required to store the files. As such, deduplication storage systems typically only store file segments that are unique (i.e., non-redundant).

Unfortunately, the process of adding new blocks to deduplication storage systems may be relatively slow, which may increase the time required to complete a backup job, particularly if the backup job includes a significant amount of data not previously backed up.

Accordingly, the instant disclosure identifies and addresses a need for additional and improved systems and methods for accelerating backup operations.

SUMMARY

As will be described in greater detail below, the instant disclosure generally relates to systems and methods for accelerating backup operations by copying files from network traffic (e.g., files that are potentially sent to volumes to be backed up) and seeding deduplicated data stores with these files.

In one example, a computer-implemented method for accelerating backup operations may include (1) identifying a volume of data that may be stored by a computing system attached to a network and that may be designated for a backup to a deduplicated data store, (2) monitoring traffic on the network for at least one data object destined for the volume of data, (3) copying the data object from the traffic on the network and (4) seeding the deduplicated data store with the data object before the backup to the deduplicated data store.

In some examples, copying the data object may include (1) identifying a network switch including a first port connected to the computing system and including a second port connected to a backup appliance for performing the backup and (2) configuring the network switch with a port mirroring feature to forward the traffic that travels via the first port to the second port.

In some examples, monitoring the traffic may include determining, based at least in part on a protocol by which the data object may be transferred, that the data object will be subject to the backup.

In some examples, monitoring the traffic may include determining, based at least in part on a network address to which the data object may be directed, that the data object will be subject to the backup.

In some examples, seeding the deduplicated data store with the data object may include creating a temporary backup of the data object to the deduplicated data store, such that the data object may be chunked into a plurality of data blocks, and each unique data block within the plurality of data blocks may be written to the deduplicated data store, a corresponding fingerprint for each unique data block being added to a fingerprint store of the deduplicated data store.

In one embodiment, the temporary backup may be configured to expire after the backup.

In some examples, the computer-implemented method may include performing the backup of the volume of data to the deduplicated data store.

In some examples, monitoring the traffic may include: (1) identifying at least one attribute of at least one previous data object that was transferred on the network, (2) determining that the previous data object was subject to a previous backup, the previous backup arising from a same backup policy as the backup, (3) determining that the data object shares the attribute and (4) determining, based at least in part on the data object sharing the attribute with the previous data object, that the data object will be subject to the backup.

In one embodiment, a system for implementing the above-described method may include (1) an identification module programmed to identify a volume of data that may be stored by a computing system attached to a network and that may be designated for a backup to a deduplicated data store, (2) a monitoring module programmed to monitor traffic on the network for at least one data object destined for the volume of data, (3) a copying module programmed to copy the data object from the traffic on the network, (4) a seeding module programmed to seed the deduplicated data store with the data object before the backup to the deduplicated data store and (5) at least one processor configured to execute the identification module, the monitoring module, the copying module and the seeding module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to (1) identify a volume of data that may be stored by a computing system attached to a network and that may be designated for a backup to a deduplicated data store, (2) monitor traffic on the network for at least one data object destined for the volume of data, (3) copy the data object from the traffic on the network and (4) seed the deduplicated data store with the data object before the backup to the deduplicated data store.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for accelerating backup operations. As will be explained in greater detail below, by copying files from network traffic (e.g., files that are potentially sent to volumes to be backed up) and seeding deduplicated data stores with these files, the systems and methods described herein may significantly accelerate backup operations (especially initial backups) and shorten backup windows.

The following will provide, with reference to FIGS. 1, 2, 4, and 5, detailed descriptions of exemplary systems for accelerating backup operations. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 6 and 7, respectively.

Figure 1:
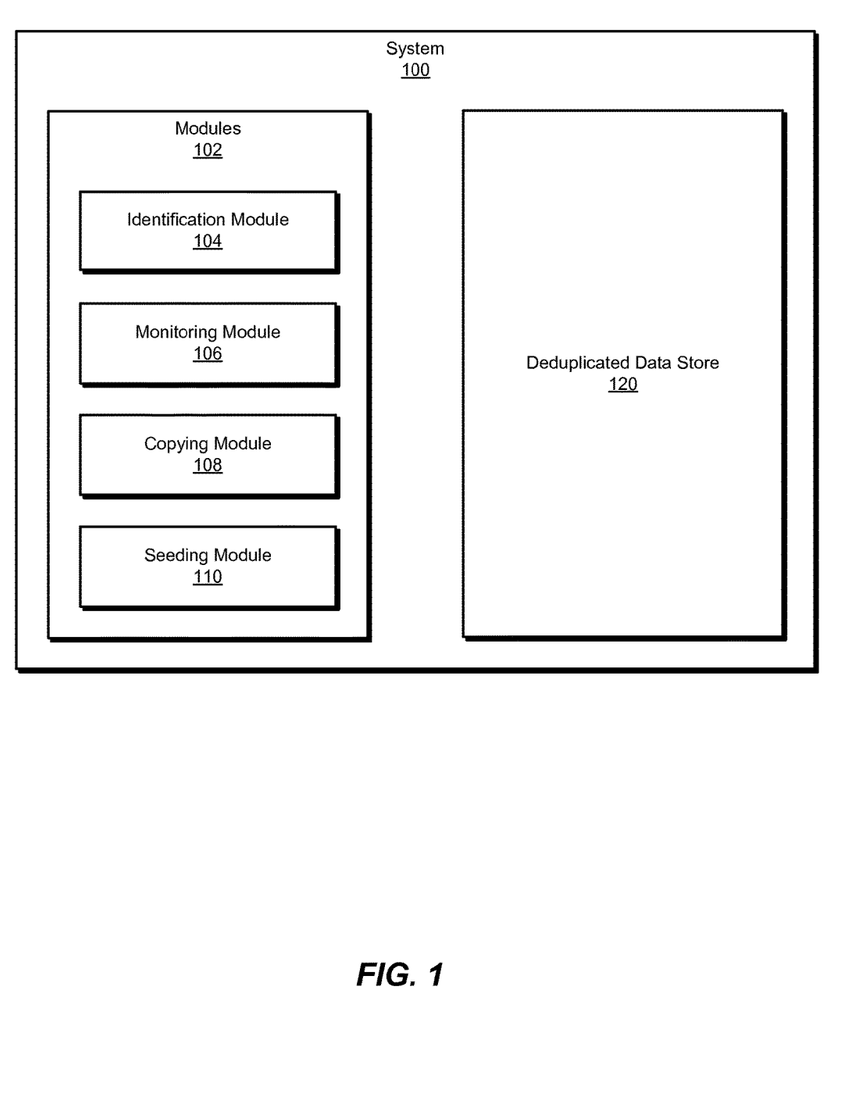
FIG. 1 is a block diagram of an exemplary system for accelerating backup operations.

FIG. 1 is a block diagram of exemplary system 100 for accelerating backup operations. As illustrated in this figure, exemplary system 100 may include one or more modules 102 for performing one or more tasks. For example, and as will be explained in greater detail below, exemplary system 100 may also include an identification module 104 programmed to identify a volume of data that is stored by a computing system attached to a network and that is designated for a backup to a deduplicated data store. Exemplary system 100 may additionally include a monitoring module 106 programmed to monitor traffic on the network for at least one data object destined for the volume of data. Exemplary system 100 may also include a copying module 108 programmed to copy the data object from the traffic on the network. Exemplary system 100 may additionally include a seeding module 110 programmed to seed the deduplicated data store with the data object before the backup to the deduplicated data store. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 610 in FIG. 6, and/or portions of exemplary network architecture 700 in FIG. 7. One or more of modules 102 in FIG. 1 may also represent all or portions of one or more special-purpose computers configured to perform one or more tasks.

As illustrated in FIG. 1, exemplary system 100 may also include one or more databases, such as deduplicated data store 120. In one example, deduplicated data store 120 may be configured to store one or more deduplicated data segments (e.g., of backed up data) and/or fingerprints of one or more deduplicated data segments.

Deduplicated data store 120 may represent portions of a single database or computing device or a plurality of databases or computing devices. For example, deduplicated data store 120 may represent a portion of computing device 202 in FIG. 2, computing system 610 in FIG. 6, and/or portions of exemplary network architecture 700 in FIG. 7. Alternatively, deduplicated data store 120 in FIG. 1 may represent one or more physically separate devices capable of being accessed by a computing device, such as computing device 202 in FIG. 2, computing system 610 in FIG. 6, and/or portions of exemplary network architecture 700 in FIG. 7.

Figure 2:
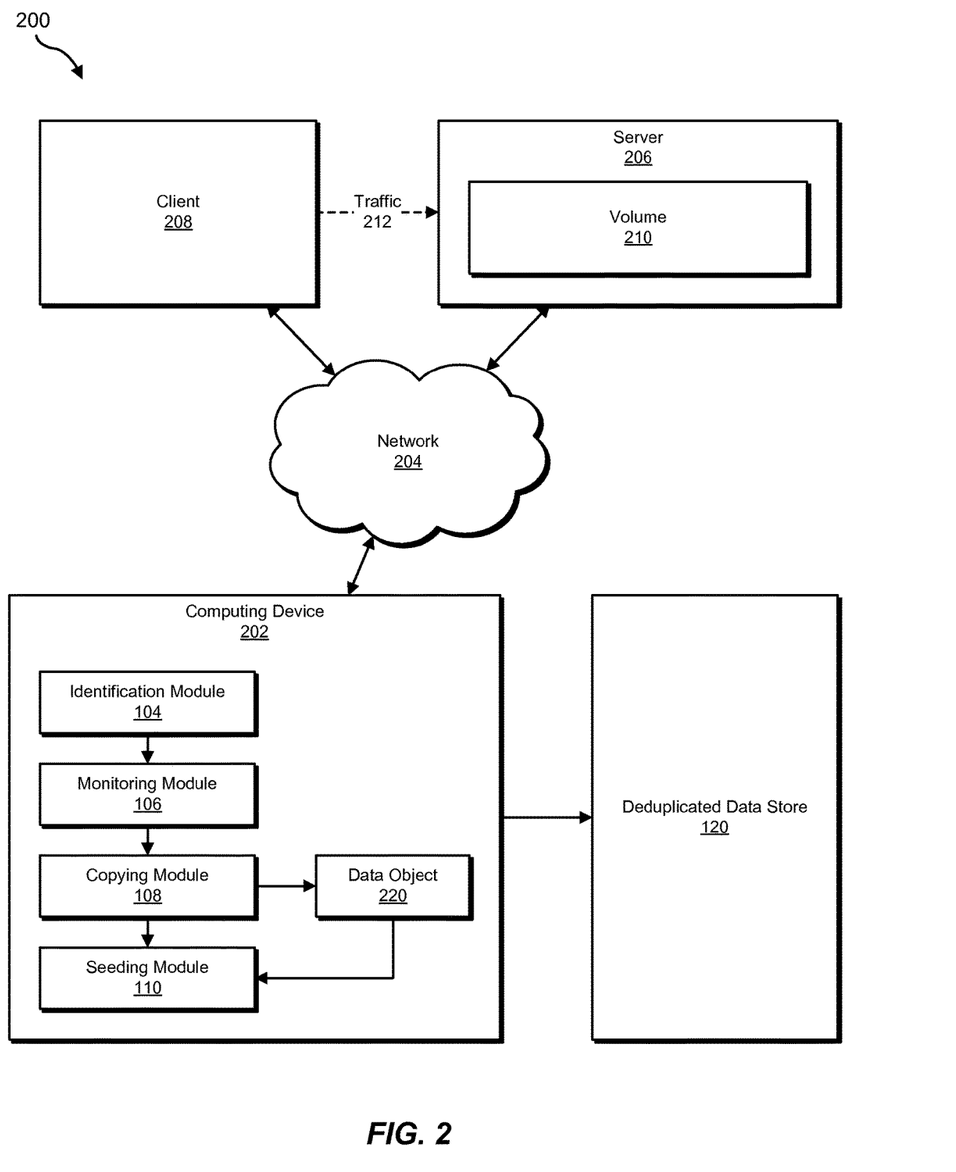
FIG. 2 is a block diagram of an exemplary system for accelerating backup operations.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 connected to a network 204 (and capable of observing network traffic on network 204, such as traffic 212 involving server 206). Computing device 202 may be programmed with one or more of modules 102 and/or may store all or a portion of the data in deduplicated data store 120. Additionally or alternatively, server 206 may be programmed with one or more of modules 102 and/or may store all or a portion of the data in deduplicated data store 120.

In one embodiment, one or more of modules 102 from FIG. 1 may, when executed by at least one processor of computing device 202 and/or server 206, facilitate computing device 202 and/or server 206 in accelerating backup operations. For example, and as will be described in greater detail below, one or more of modules 102 may cause computing device 202 to accelerate backup operations. For example, and as will be described in greater detail below, identification module 104 may be programmed to identify a volume 210 that is stored by a computing system attached to network 204 (e.g., server 206) and that is designated for a backup to deduplicated data store 210. Monitoring module 106 may be programmed to monitor traffic 212 on network 204 for at least one data object destined for volume 210 (e.g., data object 220). Copying module 108 may be programmed to copy data object 220 from traffic 212 on network 204. Seeding module 110 may be programmed to seed deduplicated data store 120 with data object 220 before the backup of volume 210 to deduplicated data store 120.

Computing device 202 generally represents any type or form of computing device capable of reading computer-executable instructions. Examples of computing device 202 include, without limitation, backup appliances, network switches, servers, desktops, laptops, tablets, cellular phones, Personal Digital Assistants (PDAs), multimedia players, embedded systems, combinations of one or more of the same, exemplary computing system 610 in FIG. 6, or any other suitable computing device.

Server 206 generally represents any type or form of computing device that is capable of storing and/or managing data. Examples of server 206 include, without limitation, file servers, application servers, and database servers configured to store data and/or provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Storage Area Network (SAN), a Personal Area Network (PAN), the Internet, Power Line Communications (PLC), a cellular network (e.g., a Global System for Mobile Communications (GSM) network), exemplary network architecture 700 in FIG. 7, or the like. Network 204 may facilitate communication or data transfer using wireless or wired connections. In one embodiment, network 204 may facilitate communication between client 208 and server 206. In some embodiments, network 204 may enable computing device 202 to observe communications between client 208 and server 206.

Figure 3:
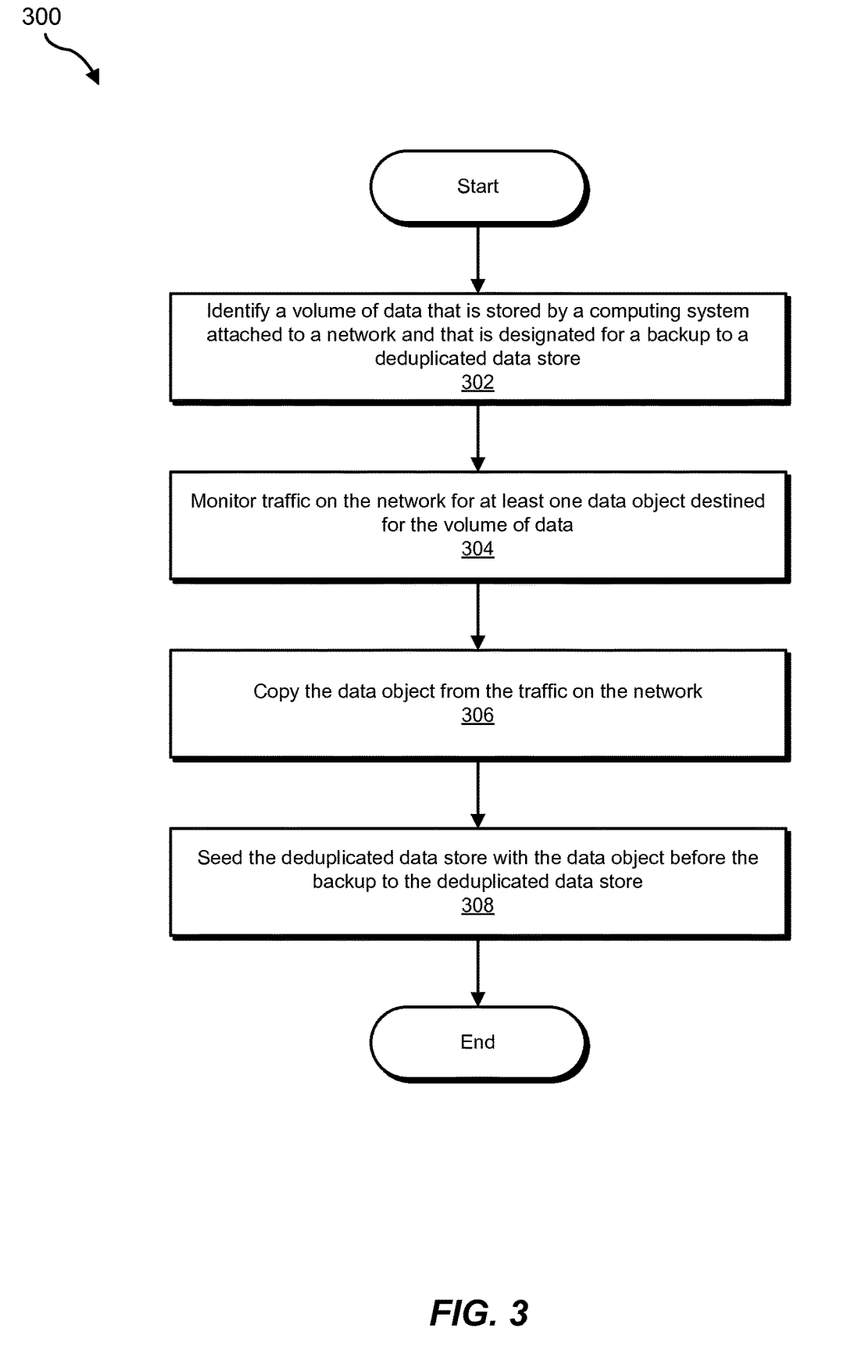
FIG. 3 is a flow diagram of an exemplary method for accelerating backup operations.

FIG. 3 is a flow diagram of an exemplary computer-implemented method 300 for accelerating backup operations. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302 one or more of the systems described herein may identify a volume of data that is stored by a computing system attached to a network and that is designated for a backup to a deduplicated data store. For example, at step 302 identification module 104 may, as part of computing device 202 in FIG. 2, identify volume 210 that is stored by server 206 attached to network 204 and that is designated for a backup to deduplicated data store 210.

As used herein, the term "volume" may refer to any distinctly identifiable collection of data. For example, the term "volume" may refer to a collection of data specified for a backup job. In some examples, the volume may correspond to a logical storage unit used by a file system to store one or more files. In some examples, the term "volume" may refer to an addressable storage space capable of storing files.

As used herein, the term "backup" may refer to any procedure (configured, scheduled, in progress, and/or completed) to backup, duplicate, and/or protect data and/or the results of any such procedure. For example, the backup may preserve a copy of a volume of data at a point in time by storing copies files from the volume in a deduplicated data system.

As used herein, the phrase "deduplicated data system" may refer to any type or form of storage system and/or device capable of identifying redundant data patterns within a collection of data and eliminating such redundancy by only storing a single instance of data. For example, a deduplicated data system may deduplicate data segments across files from one or more backup images. As used herein, the phrase "data segment" may refer to any unit of data. Examples of a data segment include, but are not limited to, a portion of a file, a portion of an image, a data block, a file, a portion of a data stream, and/or a database entry. As used herein, the phrase "data container" may refer to a collection of deduplicated data segments stored for reference within a deduplicated data system.

In some examples, the network (or a portion of the network) may be configured for file uploads and/or transfers, such that a significant portion of data transmitted across the network (or transmitted by certain protocols) represents data that will be stored to the volume and require backup. For example, the network may provide file transfers for a financial organization (e.g., to exchange trading data, exchange files with banks and/or trading partners, etc.). For example, the network may be configured for file transfers by File Transfer Protocol ("FTP") to facilitate applications such as MORGANDIRECT COMMERCIAL, MERRILL LYNCH CLEAR, and JSCAPE. In some examples, the systems and methods described herein may facilitate significantly more efficient backup operations in such file-transfer-intensive environments.

In another example, the network may represent an enterprise network with many file servers storing business data (e.g., including the computing system storing the volume of data). In this example, most of the data on the file servers may originate from employees of the enterprise uploading files to the file servers (e.g., via FTP, Network File System ("NFS"), Common Internet File System ("CIFS"), etc.). In this example, the systems and methods described herein may facilitate significantly more efficient backup operations due to (1) most data requiring backup having first been uploaded on the network and/or (2) most data being transferred by certain protocols and/or certain network addresses representing data that will require a backup.

In another example, the network may facilitate communications between telecom switching systems and billing systems. For example, a core switch may generate call detail records ("CDRs") in the form of files encoded with Abstract Syntax Notation One ("ASN.1"). A billing system may fetch the CDR files from the core switches via FTP and/or File Transfer Access and Management ("FTAM").

In another example, the network may be in a call center environment that uses Voice over Internet Protocol ("VOIP") technology. In this example, calls to service representatives by customers may be recorded and subject to backups. Accordingly, the systems and methods described herein may monitor the control channel of VOIP calls and perform a protocol analysis (e.g., to identify protocols such as Session Initiation Protocol ("SIP"), CISCO Skinny Call Control Protocol ("SCCP"), Media Gateway Control Protocol ("MGCP"), H.323, etc.) to save the voice stream from the VOIP call (e.g., a Real-time Transport Protocol (RTP) stream) and use the voice stream to seed the deduplicated data store.

Identification module 104 may identify the volume of data in any of a variety of ways. For example, identification module 104 may identify the volume of data by communicating with a backup system configured to back up the volume of data. In some examples, identification module 104 may identify the volume of data by executing on a backup appliance that is configured to back up the volume of data. Additionally or alternatively, identification module 104 may identify the volume of data by identifying the computing system that stores the volume of data. For example, identification module 104 may identify a network address of the computing system (e.g., to copy network traffic addressed to the computing system). In some examples, identification module 104 may identify the volume of data simply by identifying the network across which data is transmitted to be stored on the volume of data.

Figure 4:
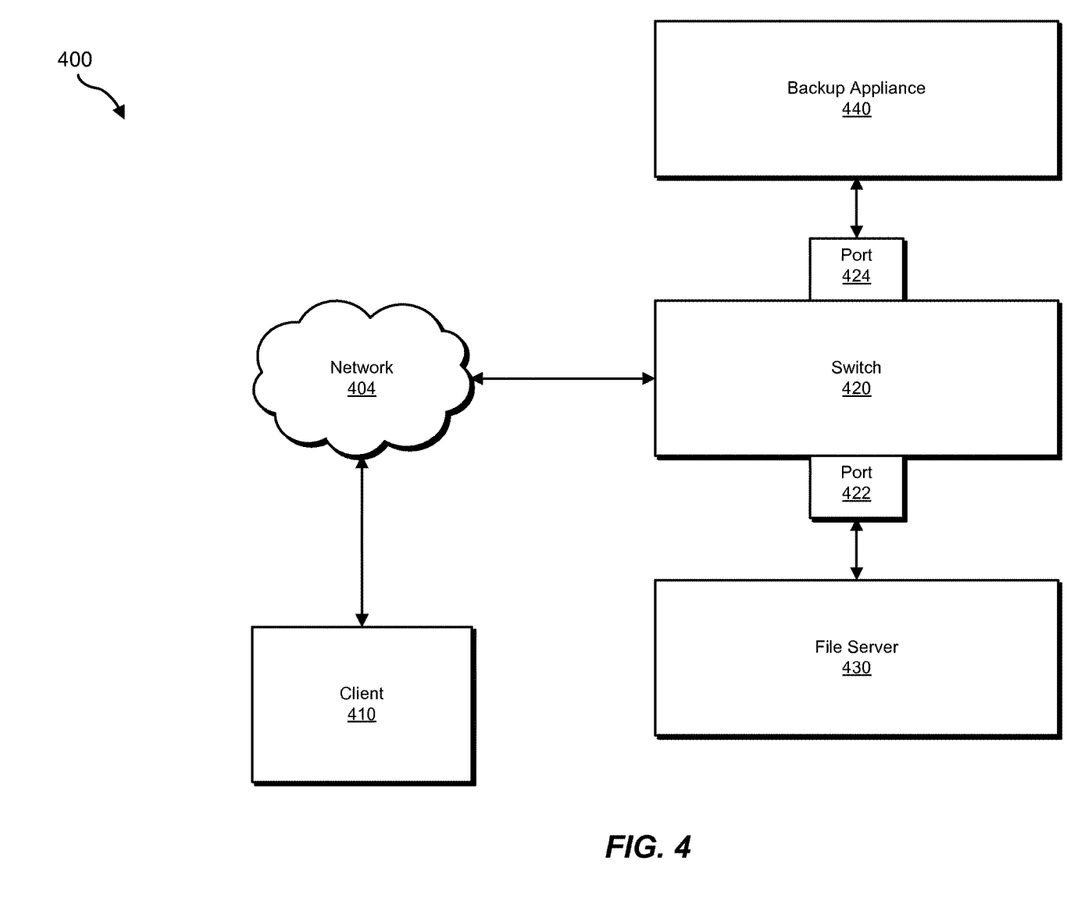
FIG. 4 is a block diagram of an exemplary system for accelerating backup operations.

FIG. 4 is a block diagram of an exemplary computing system 400. As shown in FIG. 4, computing system 400 may include a network 404 connecting a client 410 to a switch 420. Switch 420 may connect to a file server 430 via a port 422 and connect to a backup appliance 440 via a port 424. Using FIG. 4 as an example, at step 302 identification module 104 may (e.g., as a part of switch 420 and/or backup appliance 440), identify a volume of data stored by file server 430 and configured for future backup by backup appliance 440.

Figure 5:
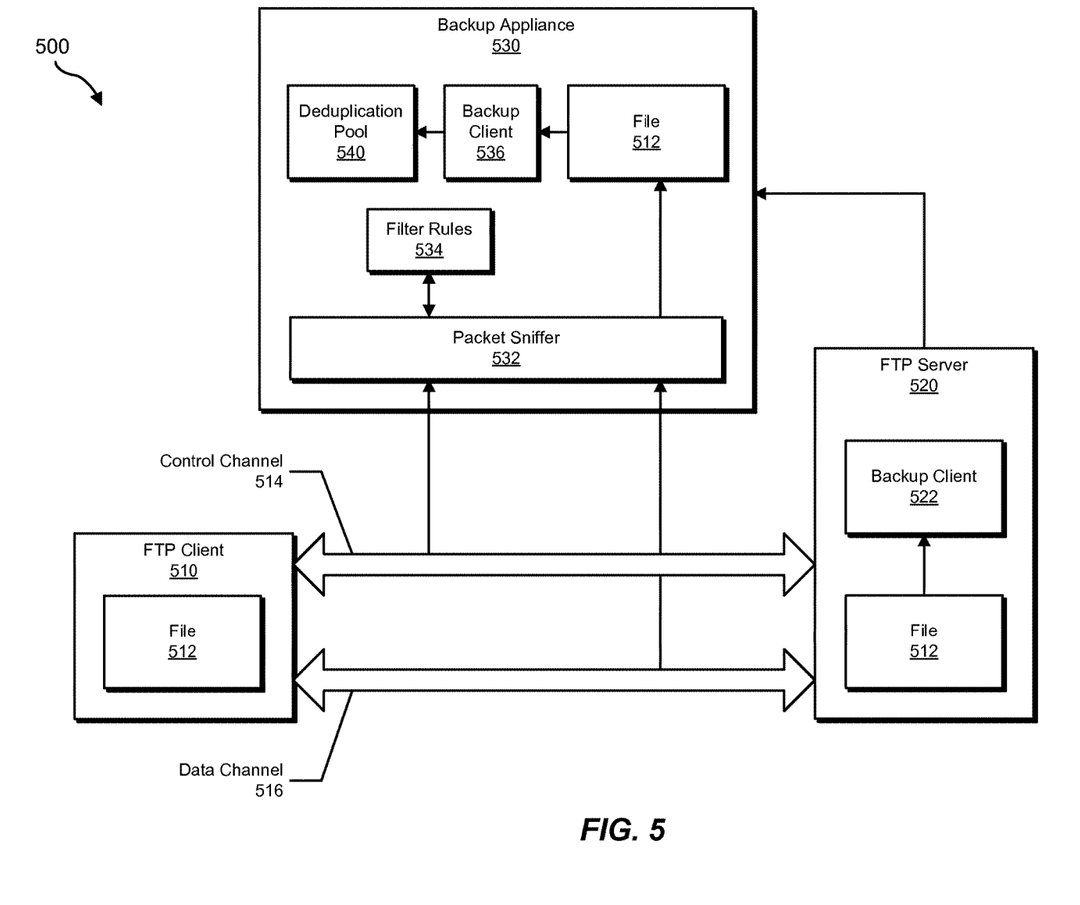
FIG. 5 is a block diagram of an exemplary system for accelerating backup operations.

FIG. 5 is a block diagram of an exemplary computing system 500. As shown in FIG. 5, computing system 500 may include an FTP client 510, an FTP server 520, and a backup appliance 530. Using FIG. 5 as an example, identification module 104 may (e.g., as a part of backup appliance 530), identify a volume of data stored by FTP server 520.

Returning to FIG. 3, at step 304 one or more of the systems described herein may monitor traffic on the network for at least one data object destined for the volume of data. For example, at step 304 monitoring module 106 may, as part of computing device 202 in FIG. 2, monitor traffic 212 on network 204 for data object 220 destined for volume 210.

As used herein, the phrase "data object" may refer to any file, document, database, and/or other object capable of deduplicated storage.

As used herein, the term "traffic" may refer to any data transmitted via a network. Examples of traffic may include, without limitation, packets, streams, and files.

Monitoring module 106 may identify the data object in any suitable manner. In some examples, monitoring module 106 may determine that the data object is destined for the volume of data and/or that the data object is likely to be subject to the backup based on one or more attributes of the traffic and/or data object. For example, monitoring module 106 may determine, based at least in part on the protocol by which the data object is transferred, that the data object will be subject to the backup. Additionally or alternatively, monitoring module 106 may determine, based at least in part on the network address to which the data object is directed, that the data object will be subject to the backup. In some examples, monitoring module 106 may determine that the data object will be subject to the backup based on a port value specified in the network address to which the data object is directed.

In some examples, monitoring module 106 may identify one or more servers and/or protocols of interest by reading a filter ruleset that specifies the servers and/or protocols to monitor for data objects. For example, an administrator may configure the filter ruleset to specify FTP communications and/or communications addressed to port 21. Monitoring module 106 may then identify the data object by identifying FTP traffic. Examples of other protocols and/or ports of potential interest that may be specified in the filter ruleset include, without limitation, Trivial File Transfer Protocol ("TFTP"), port 69, NFS, port 2049, port 111, CIFS, port 137, port 138, port 139, Hypertext Transfer Protocol ("HTTP"), port 80, SIP, port 5060, MGCP, port 2427, port 2428, CISCO SCCP, port 2000, H.323, and port 1720.

Using FIG. 5 as an example, a packet sniffer 532 on backup appliance 530 may be configured to monitor network traffic (e.g., between FTP 510 and FTP server 520) based on filter rules 534. For example, filter rules 534 may specify that packet sniffer 532 may monitor traffic addressed to FTP server 520 (e.g., network address "2.2.2.2"). FTP client 510 (e.g., at network address "1.1.1.1") may establish a control channel 514 with FTP server 520 to communicate with FTP server 520 that it will open port 50000 for uploading data. Accordingly, packet sniffer 532 may update filter rules 534 to capture traffic from "1.1.1.1/50000" to "2.2.2.2/20" based on a determination that FTP by default uses port 20 for the data channel. FTP client 510 may then transmit file 512 to FTP server 520 via a data channel 516, and packet sniffer 532 may identify the transmission.

In some examples, monitoring module 106 may use filter rules for selectively monitoring network traffic based on an analysis of which filter rules have successfully identified data to be backed up in the past. For example, monitoring module 106 may determine which rules lead to capturing more data objects that ultimately are destined for backup, avoid the processing of data objects that are not ultimately destined for backup, and/or improve the ratio of data objects captured that are ultimately backed up vs. data objects captured that are not ultimately backed up. For example, monitoring module 106 may determine which protocols tend to be used to transmit data objects destined for eventual backup. In some examples, monitoring module 106 may (1) identify at least one attribute of at least one previous data object that was transferred on the network, (2) determining that the previous data object was subject to a previous backup, the previous backup arising from a same backup policy as the backup, (3) determining that the data object shares the attribute and (4) determining, based at least in part on the data object sharing the attribute with the previous data object, that the data object will be subject to the backup. The attribute may include any suitable attribute, such as network address, port, and/or protocol used.

Monitoring module 106 may monitor the traffic on the network in any suitable manner. As will be explained in greater detail below, in some examples monitoring module 106 may execute on a backup appliance connected to the same network switch as one or more file servers that store data files to be backed up. In these examples, a port used by a file server may be mirrored to the port used by the backup appliance, such that the backup appliance may receive network traffic directed to the file server.

At step 306 one or more of the systems described herein may copy the data object from the traffic on the network. For example, at step 306 copying module 108 may, as part of computing device 202 in FIG. 2, copy data object 220 from traffic 212 on network 204.

Copying module 108 may copy the data object from the traffic on the network in any suitable manner. For example, copying module 108 may execute on a backup appliance connected to the same network switch as one or more file servers that store data files to be backed up. In these examples, a port used by a file server may be mirrored to the port used by the backup appliance, such that the backup appliance may receive network traffic directed to the file server. Accordingly, copying module 108 may create a copy of the data object from the mirror of the traffic directed to the file server. Using FIG. 4 as an example, port 422 connecting file server 430 may be mirrored to port 424 connecting backup appliance 440. Accordingly, traffic directed to file server 430 may be duplicated to backup appliance 440.

For example, copying module 108 may identify a network switch including a first port connected to the computing system and including a second port connected to a backup appliance for performing the backup. Copying module 108 may then configure the network switch with a port mirroring feature to forward the traffic that travels via the first port to the second port. Additionally or alternatively, in some examples copying module 108 may simply determine that the first port is mirrored to the second port and/or operate under the assumption that the first port is mirrored to the second port.

Using FIG. 5 as an example, at step 306 copying module 108 may copy file 512 from data channel 516 to backup appliance 530.

At step 308 one or more of the systems described herein may seed the deduplicated data store with the data object before the backup to the deduplicated data store. For example, at step 308 seeding module 110 may, as part of computing device 202 in FIG. 2, seed deduplicated data store 120 with data object 220 before the backup of volume 210 to deduplicated data store 120.

As used herein, the term "seeding" may refer to any process whereby deduplicated data segments are populated into a deduplicated data store (e.g., into one or more data containers of a deduplicated data system), such that future instances of the deduplicated data segments may be stored in the deduplicated data store by reference (e.g., without requiring retrieving and/or saving the future instances into the deduplicated data store). For example, by looking up a fingerprint of an additional instance of a data segment with which the deduplicated data store has already been seeded and thereby locating the data segment within the deduplicated data store, one or more of the systems described herein may simply reference the original instance of the data segment rather than retrieving and/or storing the additional instance, thereby potentially facilitating a backup of one or more data objects with which the deduplicated data store has already been seeded.

Seeding module 110 may seed the deduplicated data store with the data object in any suitable manner. For example, seeding module 110 may create a temporary backup of the data object to the deduplicated data store, such that the data object is chunked into a plurality of data blocks, and each unique data block within the plurality of data blocks is written to the deduplicated data store, a corresponding fingerprint for each unique data block being added to a fingerprint store of the deduplicated data store. For example, seeding module 110 may execute on a backup appliance. In this example, seeding module 110 may use and/or operate as a part of a local backup client on the backup appliance to create a backup job for the data object (and, in some examples, other data objects similarly identified and copied for the purpose of seeding the deduplicated data store).

In some examples, the temporary backup may be configured to expire after the backup. For example, the systems described herein may have seeded the deduplicated data store with one or more data objects that were not destined for backup. Accordingly, to avoid wasting storage space, seeding module 110 may configure the temporary backup to expire directly after the backup has completed, and any unused seeded data blocks may be removed by a garbage collection process due to a lack of any referring data objects.

In some examples, one or more of the systems described herein may perform the backup of the volume of data to the deduplicated data store. For example, a backup module may, as a part of a backup appliance and according to a defined backup job, back up the volume of data to the deduplicated data store. Because many of the data objects in the volume of data may have already been seeded to the deduplicated data store, this backup may proceed significantly more quickly than it would using traditional backup systems, thereby decreasing the backup window for the backup.

As explained above in connection with method 300 in FIG. 3, a network may include one or more file servers and/or similar devices for receiving data that is to be protected by backups. A computing device attached to the network (e.g., a backup appliance) may monitor network traffic to the file servers (e.g., through port mirroring on a network switch to which the file servers and computing device are attached). The computing device may retrieve data objects (such as files) from the network traffic (either all data objects, or data objects that fit a specified ruleset, such as data objects transmitted by specified protocols). These data objects may be used to seed a deduplicated data store that is used to store backups of the file servers (e.g., by performing a separate backup of the data objects to the deduplicated data store that results in their deduplication). Later, when many or all of these data objects are to be backed up from the file servers, the deduplicated data store will have already been seeded with these data objects, allowing for a quick backup operation and/or short backup window.

Figure 6:
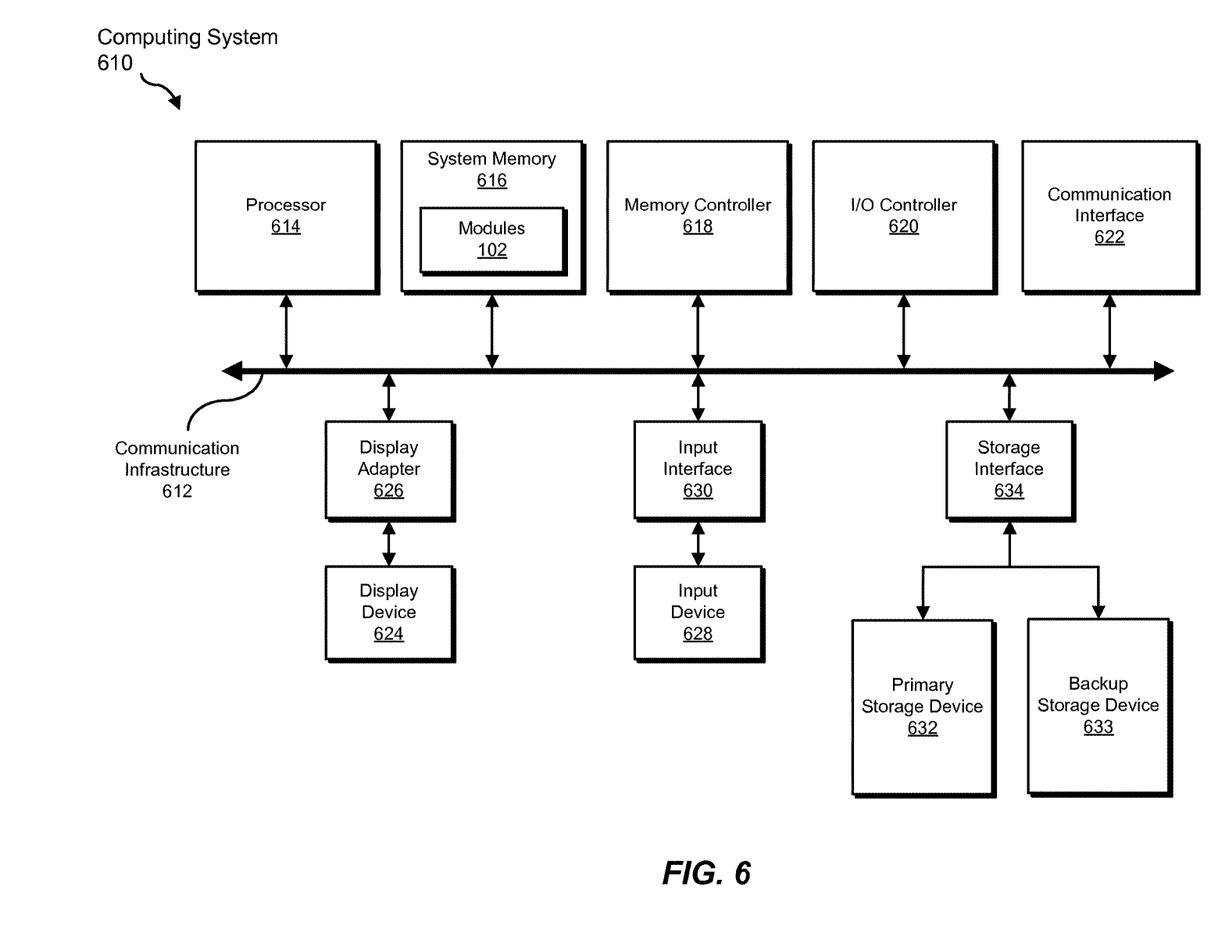
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the identifying, monitoring, determining, copying, configuring, seeding, creating, and performing steps described herein. All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of processing unit capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, deduplicated data store 120 from FIG. 1 may be stored in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., Compact Disks (CDs) or Digital Video Disks (DVDs)), electronic-storage media (e.g., solid-state drives and flash media), and other distribution systems.

The computer-readable-storage medium containing the computer program may be loaded into computing system 610. All or a portion of the computer program stored on the computer-readable-storage medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
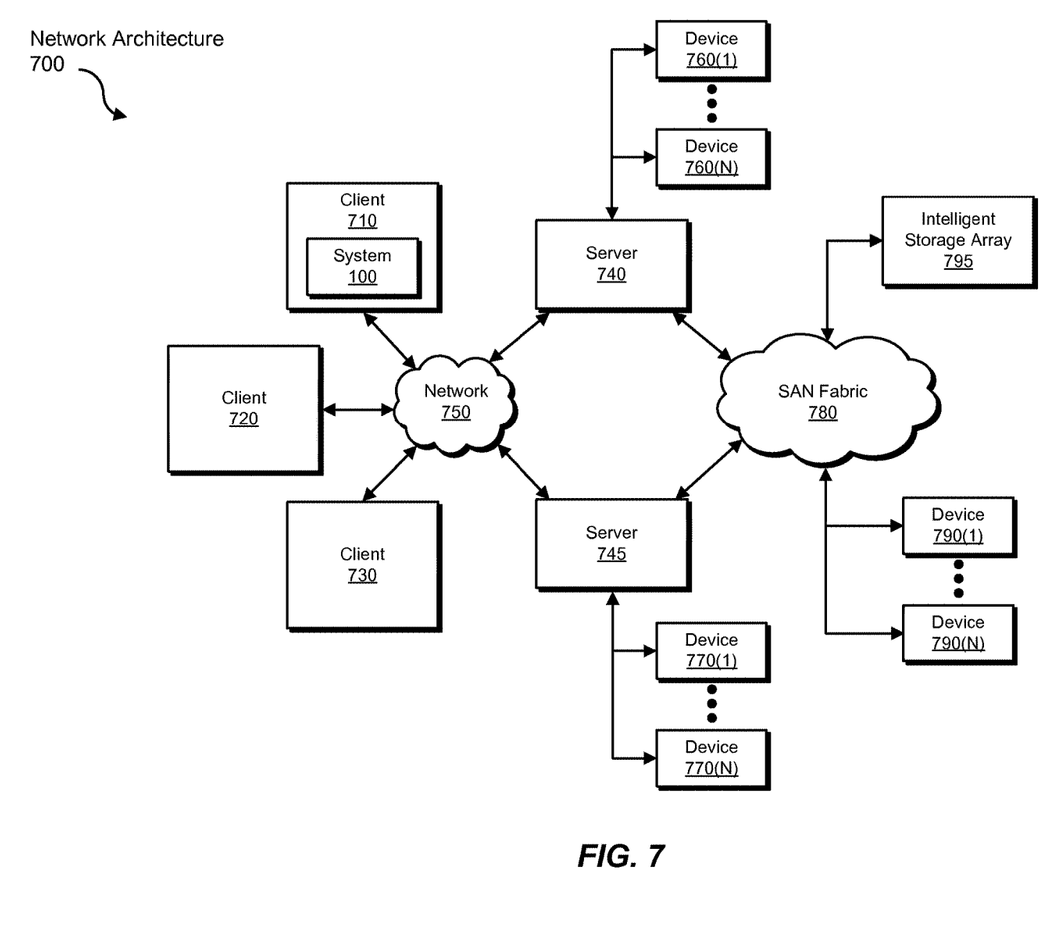
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the identifying, monitoring, determining, copying, configuring, seeding, creating, and performing steps disclosed herein. All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for accelerating backup operations.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive network traffic to be transformed, transform the network traffic, output a result of the transformation to a backup appliance, use the result of the transformation to seed a deduplicated data store, and store the result of the transformation to the deduplicated data store. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for accelerating backup operations, at least a portion of the method being performed by a computing device comprising at least one processor, the method comprising:
    identifying a storage unit of a computing system, wherein:
        the computing system is attached to a network;
        the storage unit is periodically backed up to a deduplicated data store by storing a copy of the storage unit at the deduplicated data store;
        any data segments that are contained within data objects stored at the storage unit and not already stored to the deduplicated data store must be transferred from the storage unit to the deduplicated data store as part of periodically backing up the data objects to the deduplicated data store; and
        any data segments that are contained within the data objects stored at the storage unit and already stored to the deduplicated data store are not required to be transferred from the storage unit to the deduplicated data store as part of periodically backing up the data objects to the deduplicated data store;
    identifying, within traffic on the network, a new data object that is destined for the storage unit but that has not reached or been stored to the storage unit, wherein the new data object contains a new data segment that has not been stored to the deduplicated data store;
    generating, before the new data object reaches the storage unit and in response to identifying the new data object within the traffic on the network, a copy of the new data object from the traffic on the network;
    seeding, before the copy of the storage unit that contains the new data object is stored to the deduplicated data store and in response to generating the copy of the new data object from the traffic on the network, the deduplicated data store with the copy of the new data object by storing, to the deduplicated data store, an instance of the new data segment from the copy of the new data object from the traffic on the network; and
    storing, after seeding the deduplicated data store with the copy of the new data object from the traffic on the network, the copy of the storage unit that contains the new data object to the deduplicated data store by:
    determining that the instance of the new data segment contained within the new data object is already stored to the deduplicated data store;
    refraining from transferring the new data segment contained within the new data object from the storage unit to the deduplicated data store; and
    creating a reference between the copy of the storage unit that contains the new data object and the instance of the new data segment that is already stored to the deduplicated data store.

2. The computer-implemented method of claim 1, wherein generating the copy of the new data object comprises:
    identifying a network switch comprising a first port connected to the computing system and comprising a second port connected to a backup appliance for performing deduplication to the deduplicated data store;
configuring the network switch with a port mirroring feature to forward the traffic that travels via the first port to the second port.

3. The computer-implemented method of claim 1, wherein identifying the new data object comprises determining, based at least in part on a protocol by which the new data object is transferred, that the new data object will be subject to a backup operation performed on the storage unit.

4. The computer-implemented method of claim 1, wherein identifying the new data object comprises determining, based at least in part on a network address to which the new data object is directed, that the new data object will be subject to a backup operation performed on the storage unit.

5. The computer-implemented method of claim 1, wherein seeding the deduplicated data store with the copy of the new data object comprises deduplicating a temporary backup of the copy of the new data object to the deduplicated data store, such that the copy of the new data object is chunked into a plurality of data segments, and each unique data segment within the plurality of data segments is written to the deduplicated data store, a corresponding fingerprint for each unique data segment being added to a fingerprint store of the deduplicated data store.

6. The computer-implemented method of claim 5, wherein the temporary backup is configured to expire after the copy of the storage unit that includes the new data object is stored to the deduplicated data store.

7. The computer-implemented method of claim 1, wherein storing the copy of the storage unit to the deduplicated data store comprises generating the copy of the storage unit at a point in time after the new data object has been stored at the storage unit.

8. The computer-implemented method of claim 1, wherein identifying the new data object comprises:
    identifying at least one attribute of at least one previous data object that was transferred on the network;
    determining that the previous data object was subject to a previous backup operation performed on the storage unit;
    determining that the new data object shares the attribute with the previous data object;
    determining, based at least in part on the new data object sharing the attribute with the previous data object, that the new data object will be subject to a subsequent backup operation performed on the storage unit.

9. A system for accelerating backup operations, the system comprising:
    an identification module programmed to identify a storage unit of a computing system, wherein:
    the computing system is attached to a network;
    the storage unit is periodically backed up to a deduplicated data store by storing a copy of the storage unit at the deduplicated data store;
    any data segments that are contained within data objects stored at the storage unit and not already stored to the deduplicated data store must be transferred from the storage unit to the deduplicated data store as part of periodically backing up the data objects to the deduplicated data store; and
    any data segments that are contained within the data objects stored at the storage unit and already stored to the deduplicated data store are not required to be transferred from the storage unit to the deduplicated data store as part of periodically backing up the data objects to the deduplicated data store;
    a monitoring module programmed to identify, within traffic on the network, a new data object that is destined for the storage unit but that has not reached or been stored to the storage unit, wherein the new data object contains a new data segment that has not been stored to the deduplicated data store;
    a copying module programmed to generate, before the new data object reaches the storage unit and in response to the new data object having been identified within the traffic on the network, a copy of the new data object from the traffic on the network;
    a seeding module programmed to seed, before the copy of the storage unit that contains the new data object is stored to the deduplicated data store and in response to generating the copy of the new data object from the traffic on the network, the deduplicated data store with the copy of the new data object by storing, to the deduplicated data store, an instance of the new data segment from the copy of the new data object from the traffic on the network;
    at least one processor configured to execute the identification module, the monitoring module, the copying module and the seeding module.

10. The system of claim 9, wherein the copying module is programmed to generate the copy of the new data object by:
    identifying a network switch comprising a first port connected to the computing system and comprising a second port connected to a backup appliance for performing deduplication to the deduplicated data store;
    configuring the network switch with a port mirroring feature to forward the traffic that travels via the first port to the second port.

11. The system of claim 9, wherein the monitoring module is programmed to identify the new data object by determining, based at least in part on a protocol by which the new data object is transferred, that the new data object will be subject to a backup operation performed on the storage unit.

12. The system of claim 9, wherein the monitoring module is programmed to identify the new data object by determining, based at least in part on a network address to which the new data object is directed, that the new data object will be subject to a backup operation performed on the storage unit.

13. The system of claim 9, wherein the seeding module is programmed to seed the deduplicated data store with the copy of the new data object by deduplicating a temporary backup of the copy of the new data object to the deduplicated data store, such that the copy of the new data object is chunked into a plurality of data segments, and each unique data segment within the plurality of data segments is written to the deduplicated data store, a corresponding fingerprint for each unique data segment being added to a fingerprint store of the deduplicated data store.

14. The system of claim 13, wherein the temporary backup is configured to expire after the copy of the storage unit that includes the new data object is stored to the deduplicated data store.

15. The system of claim 9, further comprising a backup module programmed to store, after the deduplicated data store has been seeded with the copy of the new data object from the traffic on the network the copy of the storage unit to the deduplicated data store by:

determining that the instance of the new data segment contained within the new data object is already stored to the deduplicated data store;

refraining from transferring the new data segment contained within the new data object from the storage unit to the deduplicated data store;

creating a reference between the copy of the storage unit and the instance of the new data segment that is already stored to the deduplicated data store.

16. The system of claim 9, wherein the monitoring module is programmed to identify the new data object by:

identifying at least one attribute of at least one previous data object that was transferred on the network;

determining that the previous data object was subject to a previous backup operation performed on the storage unit;

determining that the new data object shares the attribute with the previous data object;

determining, based at least in part on the new data object sharing the attribute with the previous data object, that the new data object will be subject to a subsequent backup operation performed on the storage unit.

17. A non-transitory computer-readable-storage medium comprising one or more computer-readable instructions that, when executed by at least one processor of a computing device, cause the computing device to:

identify a storage unit of a computing system, wherein the computing system is attached to a network;

the storage unit is periodically backed up to a deduplicated data store by storing a copy of the storage unit at the deduplicated data store;

any data segments that are contained within data objects stored at the storage unit and not already stored to the deduplicated data store must be transferred from the storage unit to the deduplicated data store as part of periodically backing up the data objects to the deduplicated data store; and any data segments that are contained within the data objects stored at the storage unit and already stored to the deduplicated data store are not required to be transferred from the storage unit to the deduplicated data store as part of periodically backing up the data objects to the deduplicated data store;

identify, within traffic on the network, a new data object that is destined for the storage unit but that has not reached or been stored to the storage unit, wherein the new data object contains a new data segment that has not been stored to the deduplicated data store;

generate, before the new data object reaches the storage unit store and in response to identifying the new data object within the traffic on the network, a copy of the new data object from the traffic on the network;

seed, before the copy of the storage unit that contains the new data object is stored to the deduplicated data store and in response to generating the copy of the new data object from the traffic on the network, the deduplicated data store with the copy of the new data object by storing, to the deduplicated data store, an instance of the new data segment from the copy of the new data object from the traffic on the network; and store, after seeding the deduplicated data store with the copy of the new data object from the traffic on the network, the copy of the storage unit that contains the new data object to the deduplicated data store by:

determining that the instance of the new data segment contained within the new data object is already stored to the deduplicated data store;

refraining from transferring the new data segment contained within the new data object from the storage unit to the deduplicated data store; and creating a reference between the copy of the storage unit that contains the new data object and the instance of the new data segment that is already stored to the deduplicated data store.

18. The non-transitory computer-readable-storage medium of claim 17, wherein the one or more computer-readable instructions cause the computing device to generate the copy of the new data object by causing the computing device to:

identify a network switch comprising a first port connected to the computing system and comprising a second port connected to a backup appliance for performing deduplication to the deduplicated data store;

configure the network switch with a port mirroring feature to forward the traffic that travels via the first port to the second port.

19. The non-transitory computer-readable-storage medium of claim 17, wherein the one or more computer-readable instructions cause the computing device to identify the new data object by causing the computing device to determine, based at least in part on a protocol by which the new data object is transferred, that the new data object will be subject to a backup operation performed on the storage unit.

20. The non-transitory computer-readable-storage medium of claim 17, wherein the one or more computer-readable instructions cause the computing device to identify the new data object by causing the computing device to determine, based at least in part on a network address to which the new data object is directed, that the new data object will be subject to a backup operation performed on the storage unit.

* * * * *

UNITED STATES PATENT AND TRADEMARK OFFICE
CERTIFICATE OF CORRECTION

PATENT NO. : 9,619,477 B1
APPLICATION NO. : 13/835035
DATED : April 11, 2017
INVENTOR(S) : Yong Tian et al.

Page 1 of 1

It is certified that error appears in the above-identified patent and that said Letters Patent is hereby corrected as shown below:

Claim 17, at Column 19, Lines 49 to 50, should read:
generate, before the new data object reaches the storage unit and in response to identifying the new data Signed and Sealed this
Eighth Day of August, 2017

Joseph Matal
*Performing the Functions and Duties of the*
*Under Secretary of Commerce for Intellectual Property and*
*Director of the United States Patent and Trademark Office*